:::

United States Patent
Piletsky et al.

(10) Patent No.: US 7,449,497 B2
(45) Date of Patent: Nov. 11, 2008

(54) POLYMERISATION METHOD, POLYMERS AND USES THEREOF

(75) Inventors: Sergey Anatoliyovich Piletsky, Cranfield (GB); Olena Volodimirivna Piletska, Cranfield (GB); Anthony Peter Francis Turner, North Crawley (GB); Khalku Karim, Cambridge (GB); Beining Chen, Sheffield (GB)

(73) Assignee: Cranfield University, Bedfordshire (GB)

( * ) Notice: Subject to any disclaimer, the term of this patent is extended or adjusted under 35 U.S.C. 154(b) by 165 days.

(21) Appl. No.: 10/507,698

(22) PCT Filed: Mar. 24, 2003

(86) PCT No.: PCT/GB03/01263

§ 371 (c)(1),
(2), (4) Date: Apr. 1, 2005

(87) PCT Pub. No.: WO03/080698

PCT Pub. Date: Oct. 2, 2003

(65) Prior Publication Data

US 2006/0122288 A1   Jun. 8, 2006

(30) Foreign Application Priority Data

Mar. 23, 2002 (GB) .................................. 0206944.1

(51) Int. Cl.
*C08F 2/50*       (2006.01)
*H01B 1/00*       (2006.01)
*H01B 1/12*       (2006.01)

(52) U.S. Cl. .............. 522/68; 522/66; 522/84; 522/166; 522/167; 522/168; 522/173; 522/178; 522/180; 522/184; 522/185; 522/186; 522/188; 522/189; 252/500; 252/518.1; 252/519.14; 252/519.3; 252/519.32; 252/519.33; 252/519.34; 252/519.4; 252/521.2; 252/521.6

(58) Field of Classification Search ................ 252/500, 252/518.1, 519.14, 519.3, 519.32, 519.33, 252/519.34, 519.4, 521.2, 521.6; 522/66, 522/71, 81, 82, 79, 68, 166, 167, 168, 173, 522/178, 180, 184, 185, 186, 188, 189, 84

See application file for complete search history.

(56) References Cited

U.S. PATENT DOCUMENTS

| 3,145,528 | A | * | 8/1964 | D Alelio ................. 149/19.92 |
| 3,203,170 | A | * | 8/1965 | D Alelio ..................... 60/219 |
| 5,185,385 | A |  | 2/1993 | Kanluen et al. |
| 5,248,734 | A |  | 9/1993 | Ober et al. |
| 5,462,696 | A | * | 10/1995 | McGinniss et al. .......... 252/500 |
| 5,578,247 | A | * | 11/1996 | McGinniss et al. .......... 252/500 |
| 6,334,965 | B1 | * | 1/2002 | Singh et al. ................. 252/500 |
| 2002/0022689 | A1 |  | 2/2002 | Menon et al. |

FOREIGN PATENT DOCUMENTS

| EP | 0 585 195 | 3/1994 |
| JP | 03 134018 | 6/1991 |
| JP | 05255486 | 10/1993 |

* cited by examiner

*Primary Examiner*—Sanza L McClendon
(74) *Attorney, Agent, or Firm*—Oblon, Spivak, McClelland, Maier & Neustadt, P.C.

(57) ABSTRACT

Monomers (e.g. thinphenes) are caused to polymerise by mixing them with an oxidising agent (and generally a solvent comprising water) and irradiating the mixture with light (visible or UV). Polymer properties can be varied by doping or chemical modification. Uses include sensor elements for assays and electrical components such as electrodes.

34 Claims, No Drawings

POLYMERISATION METHOD, POLYMERS AND USES THEREOF

TECHNICAL FIELD

The present invention relates to a polymerisation method, polymers and uses thereof. It is particularly but not exclusively concerned with a method for photochemical polymerisation of monomers using an aqueous, organic or water-organic mixed environment, and with applications of this method and of polymers formed thereby. Material synthesised in this way may comprise diners, oligomers, polymers, and mixtures. They may be grafted to the illuminated surface during polymerisation or collected from solution and used afterwards. Polymers prepared as described above or materials coated with polymer may be used in many fields, e.g. analytical chemistry (sensors, assays), electronics, optical and electrooptical devices.

The polymerisation of thiophene derivatives in water is an area of particular interest. Until now there has been an absence of reproducible methods giving high yields of polymer.

BACKGROUND ART

| Patent | Inventor (s) | Issued | Title |
| --- | --- | --- | --- |
| US4717673 | Wrighton et al. | 1/1988 | Microelectrochemical devices. |
| US4729851 | Brainling | 3/1988 | Polymers with conjugated double bonds. |
| US4585581 | Skotheim | 4/1986 | Polymer blends for use in photoelectrochemical cells for conversion of solar energy to electricity |
| US4804594 | Jow et al. | 2/1989 | Predoped conductive polymers as battery electrode materials. |
| US5188766 | Eiffler | 3/1990 | Electrically conductive polymer compositions, processes and polymers useful for preparing the polymer compositions. |
| US4986886 | Wei et al. | 5/1990 | Polymerization of thiophene and its derivatives |
| US4731311 | Suzuki et al. | 10/1986 | Electrically conductive material and secondary battery using the electrically conductive material |
| US5106690 | Stramel et al. | 12/1990 | Method for producing electrically conductive pigmentary composites |
| US5198153 | Angelopoulos et al. | 5/1989 | Electrically conductive polymeric |
| US5370825 | Angelopoulos et al. | 3/1993 | Water-soluble electrically conducting polymers, their synthesis and use |
| US4954414 | Adair et al. | 9/1990 | Photosensitive composition containing a transition metal complex cation and a borate anion and photosensitive materials employing the same |

JOURNAL LITERATURE

Bryce et al. Soluble, conducting polymers from 3substituted thiophenes and pyrroles. J. Chem. Soc. Chem. Commun., 466-467, 1987.

Sato et al. Soluble conducting polymers by electrochemical polymerization of thiophenes having long alkyl substituents. Synthetic Metals, 18, 229-232, 1987.

DISCLOSURE OF INVENTION

The present invention relates to the polymerisation of monomers. It is primarily concerned with monomers susceptible to radical and/or oxidative polymerisation. Monomers to be polymerised may comprise one or more types selected from paraphenylenevinylenes, anilines, azines, thiophenes, p-phenylenes, furanes, pyrroles, selenophenes, acetylenes and olefins, any of which may be substituted or unsubstituted.

The polymerisation system generally involves one or more solvents which may be aqueous, organic, or mixed aqueous-organic.

Thus the invention provides a method for preparation of a polymer comprising: a) mixing of monomers, oxidiser, and optionally solvent; and b) illuminating the mixture with visible or UV light.

In further aspects the invention provides polymers as prepared, directly or indirectly, by such a method; and uses of such polymers.

MODES FOR CARRYING OUT THE INVENTION

A preferred type of embodiment involves oxidative photopolymerisation of thiophene derivatives, in particular 3-thiopheneboronic and 3-thiophenecarboxylic acids. Reaction is performed in the presence of oxidising agent, preferably, potassium dichromate or copper (II) chloride. It is initiated by illumination with visible light. There is no sign of polymerisation observed in the dark. The mechanism of the reaction is not clear. Influence of pH of the solution (reaction rate drastically decreases at pH higher than 5.0) and chelating agents (cyclen, in 10 mM concentration decreases polymer formation by 15%) indicate a significant role of the acidic group and metal (particularly chromium ions from dichromate) in the polymerisation process. 3-Thiopheneboronic acid, esterified with diethanolamine was not polymerisable at all under the conditions described.

It is possible that there is radical formation in the process of thiophene oxidation, which can be stabilised by neighbouring acid groups. Illumination is a necessary key step for the chain growth. Chromium complexes are well known photocatalysts which are able to generate radicals (U.S. Pat. No. 4,954,414). Neither chromium (II) nor chromium (III) ions are able to initiate photopolymerisation of 3-thiopheneboronic acid in the absence of oxidising agent. Some polymer formation can be observed when chromium (III) is used together with ammonium persulfate. All these observations indicate that in order to polymerise thiophene derivatives the presence of both oxidiser and light is required.

The present invention can be employed for coating of surfaces with polymers, particularly polymerised thiophene derivatives. Practically any surface (e.g. glass, fluorocarbons such as ptfe (teflon), quartz, other synthetic polymers such as polyethylene, metals, etc.) can be coated by the polymer during the described process. The polymer can also be collected from the reaction and used subsequently in solution to coat the surfaces mentioned. The polymers can also be grafted to another polymer present in the solution during polymerisation.

Polymers embodying the invention may be used as coatings for microelectochemical and electrochemical devices. The polymer can be prepared in insulating or conducting forms, depending on polymerisation conditions. Depending on material properties and application required, the most important areas of the material utilisation are:

1) Electromagnetic shielding as protective materials in commercial and domestic applications.

2) Microwave protective shielding and filtering coatings for military and domestic applications (Stealth and Radar technologies).

3) Coatings of electronic components and devices for conducting purposes for use in eletrostatic dissipation in commercial and domestic applications.

4) Electroluminescent display devices, i.e. for organic LED's.

5) Use as photochromic materials for Smart Window technology.

6) Novel sensing materials in sensors and arrays, e.g. gas sensors and optical devices.

7) Use in solid state batteries as an environmentally friendly energy source.

8) Use in storage of solar energy.

9) Use in photorecording and photosensitive materials.

A polymer can be produced in the presence of a template material, which may be (a compound, a macromolecule or part of a biological system such as a cell or cell component (e.g. a cell wall or part thereof). The template material may then be removed so that the polymer has complementary cavities. It may then be capable of acting as a specific binding member for the template material. It may be useful in assays.

The properties of a polymer can be altered by doping (e.g. with iodine or an organic acid, which may be added to the mixture before polymerisation or afterwards) or by chemical modification (e.g. esterification, reduction, conjugation with other molecules, applied to the monomer or the product of polymerisation. The properties affected may be physical (e.g. solubility), optical or electrochemical (e.g. conductivity).

The synthesised polymers and polymer-coated articles may find use: (a) in microelectrochemical devices, e.g. as conductive or insulating layers, electrodes, contacts etc; (b) in capacitors for storage of solar energy or batteries, e.g. as electrodes or electrode coatings; (c) as electromagnetic and microwave interference coatings; (d) in electronic applications and fabrications, e.g. as conductive or insulating layers, electrodes, contacts etc; (e) as photorecording and photosensitive material; (f) in sensors and assays, e.g. as conductive or insulating layers, electrodes, contacts, detectors, immobilisation or sensitive matrices etc; (g) in optical and nonlinear optical devices, including electroluminescence devices; and (h) as protective materials.

Some examples below describe the polymer preparation, characterisation and possible application.

EXAMPLES 1) 2 ml of 0.1 M 3-thiopheneboronic acid in 50% water-ethanol mixture was mixed with 2 ml of 0.2 M $K_2Cr_2O_7$ in water and transferred to a polystyrene cuvette. Illumination with a 100 W white lamp led to the formation of a brown pellet with simultaneous grafting of the poly-thiopheneboronic acid to the polystyrene surface. Poly-thiopheneboronic acid was collected and washed with water, methanol and diethyl ether. After drying, the dark brown pellet was pressed into a disk to measure the material's conductivity.

2) 2 ml of 0.1 M 3-thiophenecarboxylic acid in 50% water-ethanol mixture was mixed with 2 ml of 0.2 M $K_2Cr_2O_7$ in water and transferred to a polystyrene cuvette. Illumination with a 100 W white lamp led to the formation of a brown pellet with simultaneous grafting of the poly-thiophencarboxylic acid to the polystyrene surface. Poly-thiophenecarboxylic acid was collected and washed with water, cold methanol and diethyl ether. After drying the resulting black pellet was pressed into a disk to measure the material conductivity.

3) 2 ml of 0.1 M 3-thiopheneboronic acid in 50% water-ethanol mixture was mixed with 2 ml of 0.2 M $CuCl_2$ in water and transferred to a polystyrene cuvette. Illumination with a 100 W white lamp led to the formation of a brown pellet with simultaneous grafting of the poly-thiopheneboronic acid to the polystyrene surface. Reaction was 10 times less effective in comparison with the one when $K_2Cr_2O_7$ was used. Poly-thiopheneboronic acid was collected and washed with water, methanol and diethyl ether. After drying, the dark brown pellet was pressed into a disk to measure the material conductivity. The polymers, prepared as described above have surface and volume conductivity in the range of $10^{-2}$ to $10^1$ S/cm, depending on polymerisation time and doping conditions.

4) The cuvette coated with poly-thiopheneboronic acid was washed with water and methanol. Coating was homogeneous and stable. In a similar way a glass cuvette, microtiter reader plate wells and a platinum electrode were coated with equal efficiency.

5) The microtiter plates were coated with poly-thiopheneboronic acid, prepared in the presence of atrazine. 50 μl of polymerisation mixture containing 0.1 M 3-thiopheneboronic acid and 5 mM atrazine, soluble in 50% water-ethanol mixture was transferred into the microplate wells and mixed with 50 μl of 0.2 mM $K_2Cr_2O_7$. Polymerisation was initiated by illumination with 100 W white lamp for 1 hour. The microplate was washed with 5 mM HCl in methanol to remove the atrazine and finally with methanol. Competitive assay performed with horseradish peroxidase-atrazine conjugate and free atrazine revealed high affinity of the atrazine-imprinted poly-thiophene boronic acid to atrazine with dissociation constant Kd=20 nM.

The incention claimed is:

1. Method for preparation of a polymer comprising:
   a) preparing a mixture by the mixing of monomers, oxidizer, and a solvent; and
   b) illuminating said mixture with visible or UV light, wherein
   said oxidizer is at least one selected from the group consisting of $Cr_2O_7^{-2}$, $MnO_4^-$, $Fe(CN)_6^{-3}$, $S_2O_8^{-2}$ and $B_4O_7^{-2}$, and
   the solvent is selected from the group consisting of an aqueous solvent and a mixed aqueous/organic solvent.

2. The method according to claim 1 wherein said monomers, comprise one or more of substituted and unsubstituted monomers selected from the group consisting of paraphenylenevinylenes, anilines, azines, thiophenes, p-phenylenes, furanes, pyrroles, selenophenes, acetylenes, olefins and mixtures thereof.

3. The method according to claim 1, further comprising chemically modifying and/or doping.

4. The method according to claim 1, wherein said mixture is coated onto a surface and said illuminating is carried out to effect photoinduced coating of said surface with the produced polymer.

5. The method according to claim 4 wherein the coated surface is selected from the group consisting of glass, quartz, fluorocarbons, other synthetic polymers, and metals.

6. A microelectrochemical device comprising polymer prepared by the method of claim 1.

7. A capacitor comprising a polymer prepared by the method of claim 1.

8. A device comprising an electromagnetic and/or microwave interference coating comprising a polymer prepared by the method of claim 1.

9. A photorecording or photosensitive material comprising a polymer prepared by the method of claim 1.

10. A sensor or assay system comprising a polymer prepared by the method of claim 1.

11. An optical device comprising a polymer prepared by the method of claim 1.

12. An optical device according to claim 11 wherein the device is a nonlinear optical device.

13. A battery comprising a polymer prepared by the method of claim 1.

14. The method according to claim 1 wherein said monomers comprise one or more thiophenes.

15. The method according to claim 1 wherein said illuminating said mixtures comprises employing visible light.

16. The method according to claim 14 wherein said illuminating said mixture comprises employing visible light.

17. A method for preparation of a polymer comprising:
 (a) preparing a mixture by the mixing of monomers, oxidizer and optionally a solvent; and
 (b) illuminating said mixture with visible or UV light,
 wherein said oxidizer is selected from the group consisting of $Cr_2O_7^{2-}$, $MnO_4^-$, $Fe(CN)_6^{3-}$, $S_2O_8^{2-}$, and $B_4O_7^{2-}$, and salts of Cu, Co, V, Mo, Ni, W, Fe, Nb, Ta, Re, Ru, Ir, and Os, and wherein said monomers comprise one or more thiophenes.

18. A method for preparation of a polymer coating on a surface comprising:
 preparing a mixture by the mixing of monomers, oxidiser, and optionally, a solvent;
 coating the mixture onto a surface; and
 illuminating said mixture coated on the surface with visible or UV light,
 wherein
 said oxidizer is at least one selected from the group consisting of $Cr_2O_7^{-2}$, $MnO_4^-$, $Fe(CN)_6^{-3}$, $S_2O_8^{-2}$ and $B_4O_7^{-2}$, and
 the illuminating effects photoinduced polymerization of the mixture coated on the surface.

19. The method according to claim 18, wherein the prepared mixture comprises a solvent.

20. The method according to claim 19, wherein the solvent is one selected from the group consisting of an aqueous solvent and a mixed aqueous/organic solvent.

21. The method according to claim 18 wherein said monomers, comprise one or more of substituted and unsubstituted monomers selected from the group consisting of paraphenylenevinylenes, anilines, azines, thiophenes, p-phenylenes, furanes, pyrroles, selenophenes, acetylenes, olefins and mixtures thereof.

22. The method according to claim 18, further comprising chemically modifying and/or doping.

23. The method according to claim 18, wherein the coated surface is selected from the group consisting of glass, quartz, fluorocarbons, other synthetic polymers, and metals.

24. A microelectrochemical device comprising polymer coated surface prepared by the method of claim 18.

25. A capacitor comprising a polymer coated surface prepared by the method of claim 18.

26. A device comprising an electromagnetic and/or microwave interference coating comprising a polymer coated surface prepared by the method of claim 18.

27. A photorecording or photosensitive material comprising a polymer coated surface prepared by the method of claim 18.

28. A sensor or assay system comprising a polymer coated surface prepared by the method of claim 18.

29. An optical device comprising a polymer coated surface prepared by the method of claim 18.

30. The optical device according to claim 29 wherein the device is a nonlinear optical device.

31. A battery comprising a polymer coated surface prepared by the method of claim 18.

32. The method according to claim 18 wherein said monomers comprise one or more thiophenes.

33. The method according to claim 18, wherein said illuminating said mixtures comprises employing visible light.

34. The method according to claim 32, wherein said illuminating said mixtures comprises employing visible light.

\* \* \* \* \*